United States Patent

Heuser

[15] 3,665,680
[45] May 30, 1972

[54] HYDROGEN DIFFUSION APPARATUS

[72] Inventor: Gustav Heuser, Union, N.J.

[73] Assignee: Engelhard Minerals & Chemical Corporation

[22] Filed: Dec. 18, 1970

[21] Appl. No.: 99,466

[52] U.S. Cl....................................55/158, 55/520
[51] Int. Cl.............................................B01d 53/22
[58] Field of Search.................................55/16, 138, 520

[56] References Cited

UNITED STATES PATENTS

| | | | |
|---|---|---|---|
| 3,274,754 | 9/1966 | Rubin | 55/158 |
| 3,279,154 | 10/1966 | Emerson | 55/158 |
| 3,437,357 | 4/1969 | Rubin | 55/158 X |
| 3,422,008 | 1/1969 | McLain | 55/158 X |

Primary Examiner—John Adee
Attorney—Samuel Kahn and John G. Kovalich

[57] ABSTRACT

A hydrogen diffusion apparatus for the purification of hydrogen comprising a tubular housing having closure means at opposite ends thereof, an outlet means through the wall of the housing, an elongated support means located internally of and longitudinally of the housing and having opposite ends each mounted on one of the closure means, a non-porous hydrogen-permeable thin-walled metal tube in the form of an elongated coil coaxially mounted on the support means, opposite ends of the tube extending from the coil and each passing through the wall of one of the closure means, a metal strip member passing between the coil and the support longitudinally thereof and at one end attached thereto, the strip having hook-like members on opposite end portions thereof, the hook-like members embracing opposite ends of the coil, whereby the coil is permitted only limited movement on the support.

4 Claims, 1 Drawing Figure

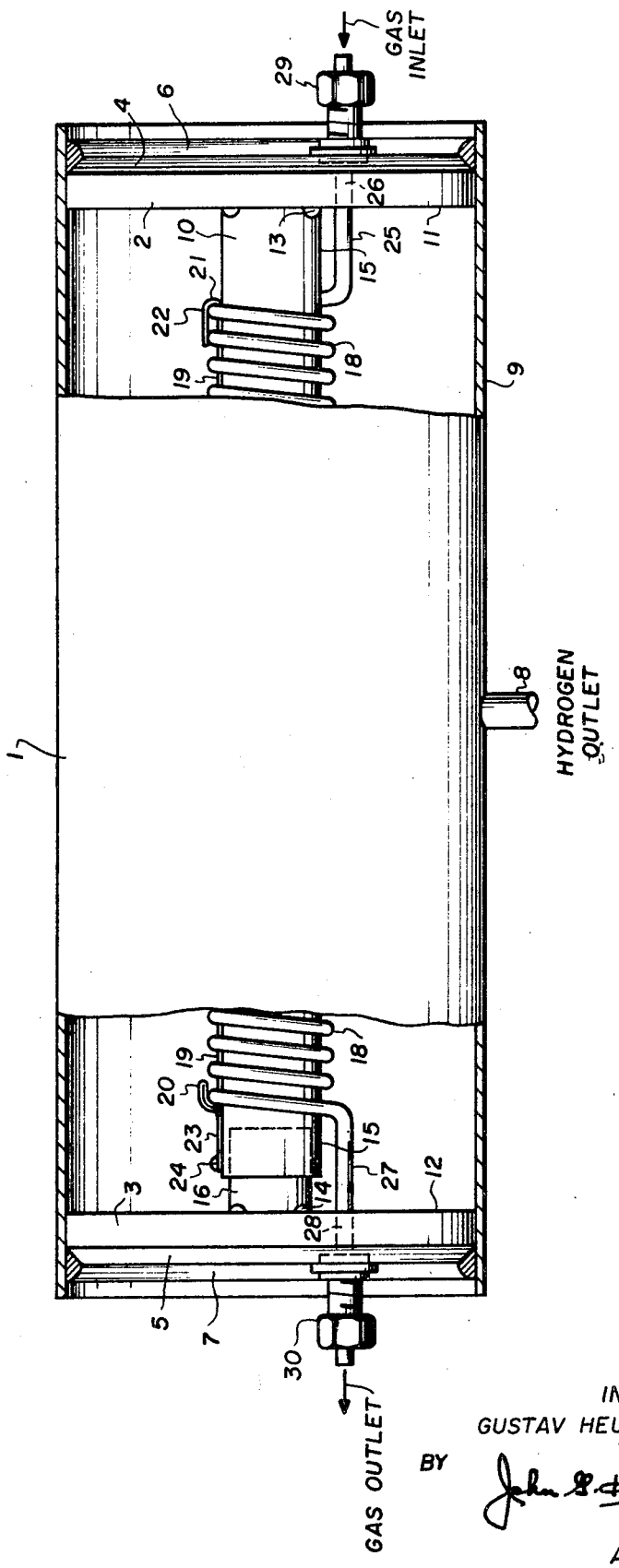

HYDROGEN DIFFUSION APPARATUS

BACKGROUND OF THE INVENTION

It is well known to purify hydrogen by diffusion through a thin wall of a non-porous hydrogen-permeable metal. Impure gas containing hydrogen is brought into contact with the metal wall under heat and pressure and only pure hydrogen permeates the wall and diffuses through it.

Known hydrogen-permeable metals include palladium and palladium alloys such as palladium-silver and palladium-nickel. A suitable binary alloy consists of palladium and 25 percent silver by weight.

One form of apparatus used to purify hydrogen by the diffusion process employs a bundle of thin-walled tubes of palladium alloy fixedly supported at the ends within a collection chamber. Impure feed gas containing hydrogen is fed into the bores of the tubes and hydrogen, which diffuses through the tube walls, is collected in and removed from the surrounding chamber.

For efficiency in the use of palladium or palladium alloy diffusion tubes, wall thicknesses between about 3 mils and 6 mils are employed. Because of the expansion and contraction of the thin-walled metal tubes due to hydrogen adsorption and removal as well as dimensional changes due to thermal stresses, which occur on heating and cooling, there is great stress on the tubes resulting in failure particularly at the joints through the collection chamber.

Also, in hydrogen diffusion purifiers, fragile thin-metal palladium tube coils are horizontally mounted on supports within a collection chamber. Although the inlet and outlet ends of the tube coils are sealed through a closure means or header at each end of a tubular collection chamber, the coils themselves are free to move on their supports. For transport such purifiers are usually carefully packaged and cushioned against mechanical shock. The free-moving coils inside the chamber cannot be protected by these means and an abrupt halting of the mass of the moving vessel, i.e. by an arrested fall, may severely damage a coil, especially near its fixed ends.

If such purifiers are installed in mobile equipment, even external protection against shock is by necessity, very limited, so that during the rigors of transit the possibility of damage to the coils contained in these vessels is greatly increased.

It has also been found that, while a limited movement of the tube coils is desirable for the relief of stresses and strains due to expansion and contraction while the unit is in use, excessive movement of the tubular coils on their supports is not desirable because such excessive movement results in stresses at the opposite end portions of the coiled tubes, particularly at the inlet and outlet end portions extending from the coils and through the headers. It has been observed that some units fail after operating a short time. Examination of the units has revealed that either the inlet and outlet end portions of the tubes adjacent their connection through the headers were ruptured, or the bend of a transition end coil into a straight inlet and outlet portion was kinked.

SUMMARY OF THE INVENTION

In accordance with the invention, there is provided a hydrogen diffusion apparatus for the purification of hydrogen, comprising a tubular housing having closure means at opposite ends thereof, an outlet means through the wall of the housing, an elongated tubular support means located internally of and longitudinally of the housing and having separate opposite ends with sliding fit each mounted on one of the closure means, a non-porous hydrogen-permeable thin-walled metal tube in the form of an elongated coil co-axially mounted on the tubular support means, opposite ends of the tube extending from the coil and each passing as a substantially straight portion through the wall of one of the closure means, a metal strip member passing between the coil and the support longitudinally thereof and at one end attached thereto, the strip having hook-like members on opposite end portions thereof, the hook-like members embracing opposite ends of the coils, whereby the coil is permitted limited tortional movement but restrained from excessive longitudinal movement on the support.

DESCRIPTION OF THE DRAWING

The FIGURE illustrates an elevational partly cut-away and partly cross-sectional side view of the apparatus of the invention.

DESCRIPTION OF THE PREFERRED EMBODIMENTS

Referring to the FIGURE, the apparatus of the invention comprises a tubular housing 1 having closure means or headers 2 and 3 of opposite ends thereof. The headers are illustrated as circular discs mounted in the end portions of a cylindrical housing. Each disc 2 and 3 is bevelled along its outer periphery as at 4 and 5, respectively, and hermetically sealed to the housing by means of circular weld fillets 6 and 7 filling the bevels 4 and 5, respectively. An outlet means 8 is formed through the wall 9 of housing 1. An elongated tubular support means 10 is mounted internally and longitudinally of the housing with opposite ends thereof each secured to the inner walls 11 and 12 of the headers 2 and 3, respectively, by welding as at 13 and 14. Preferably, the support 10 is formed of one long tube 15 and one short guide tube 16 with the short guide tube being telescoped into the long tube. In this manner the support, in two parts, is secured to the headers prior to mounting the headers into the housing 1 as shown. Prior to mounting the headers into the housing, non-porous thin-walled palladium or palladium alloy tube in the form of an elongated coil 18 is co-axially mounted on the support, i.e. on the long support tube 15. A metal restrain strip 19 having a hook-like member 20 on one end portion thereof is passed between the support 10 and coil 18 after which the other end 21 of the restraint strip 19 is formed into another hook-like member 22 whereby both hook-like members are caused to embrace the opposite ends of the coil 18 as illustrated. The coil 18 is mounted on the support and the substantially straight end portion 25 of the diffusion tube which extends from the coil 18 is passed through an opening 25 in the header 2 and extends outwardly thereof. An end portion 23 of the restraint strip 19 adjacent the hook-like member 20 is welded to the support tube 15 as at 24. The assembly including header 2, the long support tube 15, the mounted coil 8 and restraint strip 19 is mounted in the housing 1. Thereafter, the short guide tube 16 attached to the header 3 is telescoped into the long support tube 15 and a substantially straight end portion 27 of the diffusion tube which extends from the end of coil 18 is threaded through an opening 28 in header 3 and extends outwardly thereof. The headers 2 and 3 are then welded to the housing 1 by means of the weld fillets 6 and 7. Thereafter, the extension portions 25 and 27 of the diffusion coil 18 which pass through the headers 2 and 3 are conventionally sealed by tubing seals 29 and 30 such as is, for example, described in U.S. Pat. No. 3,437,357.

Various modifications of the invention are contemplated within the scope of the appended claims.

I claim:

1. A hydrogen diffusion apparatus for the purification of hydrogen, comprising a housing having closure means at opposite ends thereof, an outlet means through the wall of the housing, an elongated support means located internally of and longitudinally of the housing and having opposite ends each mounted on one of the closure means, a non-porous hydrogen-permeable thin-walled metal tube in the form of an elongated coil co-axially mounted on the support means, opposite ends of the tube extending from the coil and each passing through the wall of one of the closure means, a metal strip member passing between the coil and the support means longitudinally thereof, the strip having hook-like members on opposite end portions thereof, the hook-like members embracing opposite ends of the coil, whereby the coil is permitted limited movement longitudinally of the support means.

2. A hydrogen diffusion apparatus according to claim 1, wherein the support means is in the form of two telescoping tubes.

3. A hydrogen diffusion apparatus according to claim 1, wherein the hook-like members loosely embrace opposite ends of the coil.

4. A hydrogen diffusion apparatus according to claim 1, whereon one end of the metal strip member is secured to the support means.

* * * * *